UNITED STATES PATENT OFFICE.

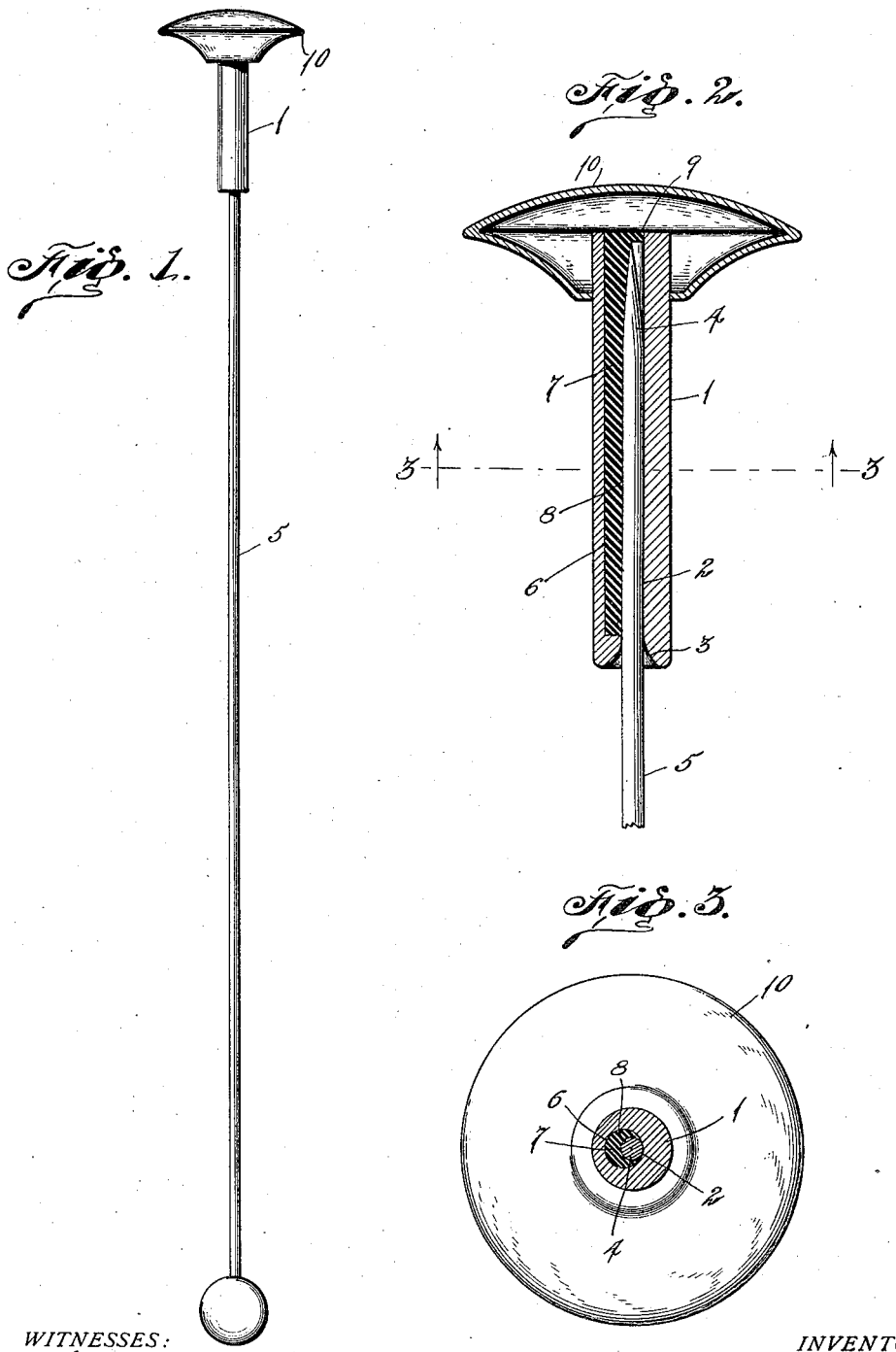

MICHAL STRBA, OF PITTSBURGH, PENNSYLVANIA, ASSIGNOR OF ONE-HALF TO STANKO BARTEC, OF PITTSBURGH, PENNSYLVANIA.

HAT-PIN-POINT PROTECTOR.

1,023,688. Specification of Letters Patent. Patented Apr. 16, 1912.

Application filed June 23, 1911. Serial No. 634,900.

*To all whom it may concern:*

Be it known that I, MICHAL STRBA, a subject of the King of Hungary, residing at Pittsburgh, in the county of Allegheny and State of Pennsylvania, have invented certain new and useful Improvements in Hat-Pin-Point Protectors, of which the following is a specification, reference being had therein to the accompanying drawing.

This invention relates to a hat pin point protector, and the objects of my invention are to provide a guard that can be easily and quickly mounted upon the pointed end of a pin to protect the same and persons in the vicinity of the point, and to provide a device that can be easily placed upon the end of a pin to prevent the same from being lost or accidentally displaced relatively to a hat.

I attain the above objects by a guard having a yieldable insert adapted to frictionally engage the pointed end of a pin to prevent accidental displacement of the guard. The guard is susceptible to any desired ornamentation, particularly that which will harmonize with the head of a pin.

The invention will be hereinafter specifically described and then claimed, and reference will now be had to the drawing, wherein:—

Figure 1 is a side elevation of the pin point protector attached to a hat pin, Fig. 2 is an enlarged vertical sectional view of the same the hat pin being broken away, and Fig. 3 is a horizontal sectional view taken on the line 3—3 of Fig. 2.

To put my invention into practice, I provide an elongated sleeve member 1 having an eccentrically disposed bore for the major portion of its length, the inner end of the sleeve member 1 has beveled or tapered walls 3 to provide an entrance opening which communicates with the bore 2. The center of the bore 2 is displaced to one side of the entrance opening. The tapered walls 3 are for the purpose of guiding the pointed end 4 of the hat pin 5 into the sleeve. By reason of the eccentricity of the bore throughout the major portion of the length of the sleeve member 1, a shoulder 11 is formed in the sleeve adjacent the inner end thereof, and fitted in the portion 6 of the bore which is of larger diameter is a yieldable gripping member 7 preferably made of rubber or other suitable yielding material, and which member at its inner end seats against the shoulder 11 and has its outer end 9 of full diameter so as to completely close the outer end of the bore 2. From the inner end of the member 7 and extending to the inner end of said member, the same is provided with a longitudinal groove substantially crescent-shaped in cross-section so that the pin shank when received in the bore is engaged on one side thereof by the yieldable member 7 and its other side is engaged with the wall of the bore 2. The closed outer end of the yieldable member 7 forms a stop for the point of the pin 5 to prevent the same protruding beyond the sleeve member 1. I preferably provide the outer end of the sleeve member 1 with a suitable cap or head 10 secured to the sleeve member 1 in any suitable or desired manner.

The longitudinal groove made in the yielding member 7 is of such size that the passage-way formed by said groove and by the adjacent wall of the sleeve for the entrance of the pin, is of less diameter than the diameter of the pin so that as the latter is inserted into the sleeve member, it will be frictionally engaged not only by the yielding member 7 but also on one side by the wall of the sleeve bore. This frictional engagement serves to securely hold the protector upon the pin point, yet permits ready detachment thereof from the pin when desired, without the necessity of employing fastening devices which must be loosened before the protector can be removed from the pointed end of the pin.

What I claim is:—

In a hat pin point protector, a sleeve member having a bore provided with a concentric and an eccentric portion, said concentric portion arranged at the inner end of the sleeve and being relatively short with respect to the length of the sleeve, said eccentric portion extending from the concentric portion to the outer end of the sleeve and forming at its terminus with said concentric portion a shoulder, the inner portion of said concentric part of said bore flaring, a head mounted upon the outer end of said sleeve and inclosing the outer end of the eccentric portion of said bore, and a yieldable gripping member mounted in and snugly engaging the wall of the eccentric portion of said bore, said member abutting against said shoulder and extending to the outer end of said eccentric portion of said bore, the said gripping member provided in its periphery with a groove extending from the inner end thereof to a point in close proximity to the outer end thereof, the inner end of said groove registering with the concentric portion of said bore.

In testimony whereof I affix my signature in the presence of two witnesses.

MICHAL STRBA.

Witnesses:
T. DENSEN,
MAX H. SROLOVITZ.

Copies of this patent may be obtained for five cents each, by addressing the "Commissioner of Patents, Washington, D. C."